United States Patent Office 3,100,995
Patented Aug. 20, 1963

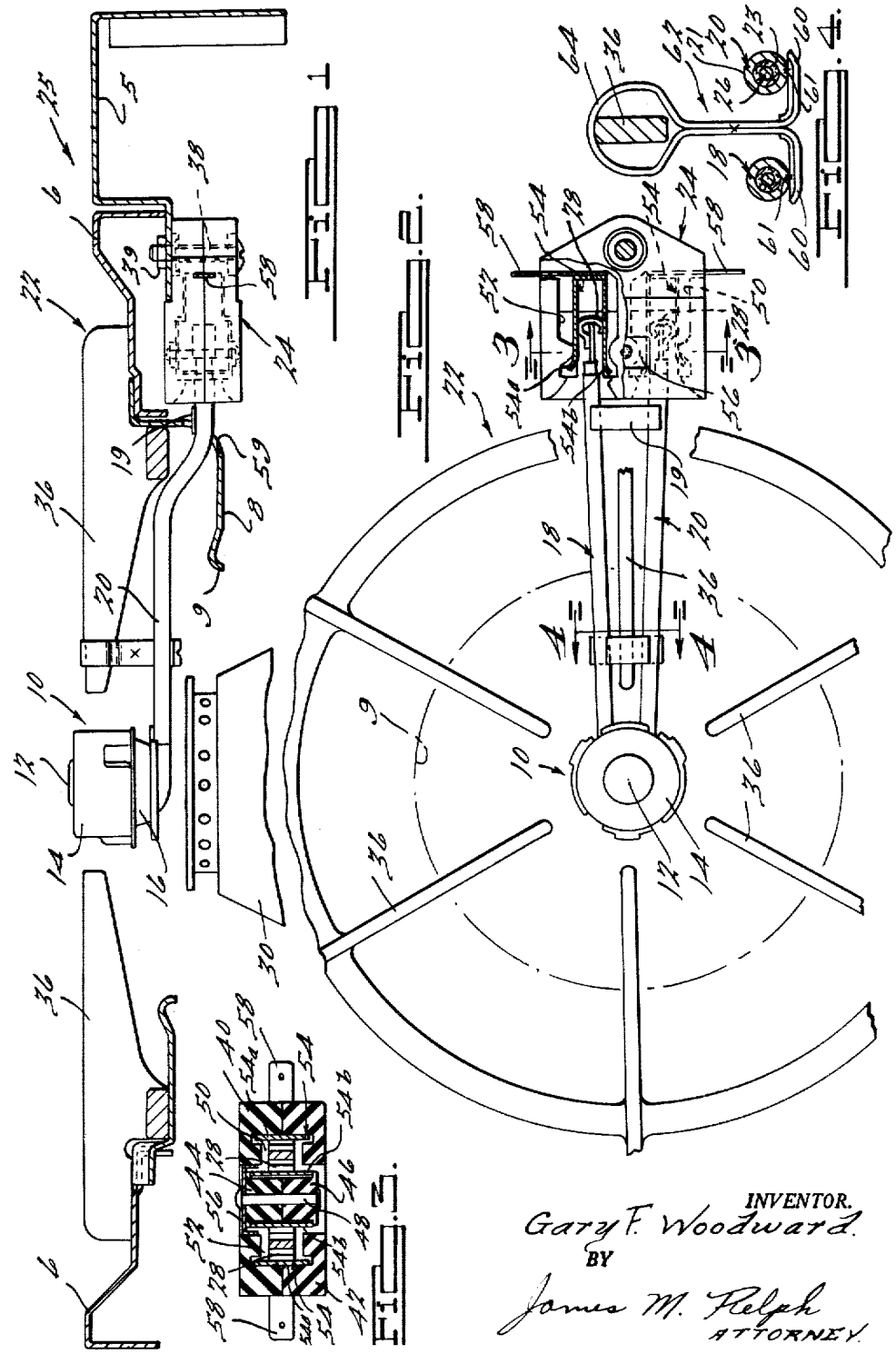

3,100,995
TEMPERATURE SENSER ASSEMBLY
Gary F. Woodward, Ann Arbor, Mich., assignor to King-Seeley Thermos Co., Ann Arbor, Mich., a corporation of Michigan
Filed Jan. 26, 1962, Ser. No. 169,066
7 Claims. (Cl. 73—343)

This invention relates to temperature senser assemblies having a temperature sensing device arranged to sense the temperature of a utensil supported on and heated by a surface heater, and more particularly to an improved mounting relationship between the temperature sensing device and the surface heater, including hanger means for structurally connecting the sensing device to a utensil supporting portion of the surface heater and means for electrically connecting the sensing device to suitable electro-responsive means for controlling the operation of its associated surface heater.

In such assemblies, it is desirable that the temperature sensing device be in intimate heat transfer relationship with the cooking utensil. Preferably, the temperature sensing device is mounted relative to the surface heater so that it will bear against the bottom surface of the cooking utensil and be free from direct heating effect by the heater. It is also desirable that the temperature sensing device and the associated heater be separately or conjointly removable from or placed within or upon an associated range, stove or the like.

Accordingly, important objects of this invention are to improve the mounting relationship between a temperature sensing device and its associated surface heater for quick removal of the sensing device separately or conjointly with portions of the surface heater from an associated range, stove or the like; to provide such an improved mounting relationship by supporting the temperature sensing device on a hanger removably carried by a utensil carrying portion of the surface heater so that the sensing device is readily removable, alone or in association with portions of the surface heater, from an associated range, stove or the like; and to provide such a mounting relationship in which, in certain forms, the sensing device has outwardly projecting rigid conductor carrying conduits having plug-in terminals which are adapted to connect to and be quickly removable from means for electrically connecting the sensing device to a suitable temperature control system for controlling the operation of the associated heater of the sensing device, and in which the rigid conduits are connected to hanger means removably carried on an arm of a utensil carrying spider portion of a surface heater for positively locating and removably supporting the sensing device in intimate heat transfer contact with the bottom surface of a utensil whose temperature is to be sensed.

With the above, as well as other and in certain cases more detailed objects in view, a preferred but illustrative embodiment of the invention is shown in the accompanying drawing, throughout the several views of which corresponding reference characters are used to designate corresponding parts and in which:

FIGURE 1 is a view in side elevation, partially in section, with unnecessary details being omitted for clarity, of a temperature senser associated with a conventional surface heater in accordance with the principles of the present invention;

FIG. 2 is a plan view, partially in section, of the arrangement illustrated in FIG. 1 with the drip pan portion and trim ring of the surface heater assembly removed and with portions of the utensil supporting spider broken away;

FIG. 3 is a view in vertical section taken along the line 3—3 of FIG. 2 looking in the direction of the arrows; and FIG. 4 is a view in vertical section taken along the line 4—4 of FIG. 2 looking in the direction of the arrows.

Referring now to the drawing, a temperature sensing device 10 is concentrically located with respect to a surface heater 25, including, for example, a gas burner unit 30 having circumferentially spaced gas ports at its outer periphery and a flame-free center portion. The surface heater 25 preferably is carried on the top surface 5 of a stove, range or the like, and in the illustrated embodiment includes a trim ring 6 that carries a drip pan 8 which preferably has a polished inner surface for the reflection of heat upwardly and a central opening 9 in which the gas burner unit 30 is concentrically located. The trim ring 6 carries a spider portion 22 having a plurality of circumferentially spaced radially inwardly extending arms 36 which support a cooking utensil or the like in heat transfer relationship with the gas burner 30.

It should, of course, be appreciated that certain principles of the invention are suitable for use in an electrical heater comprising spider means which carry a spirally coiled electrical heating element.

The illustrated sensing device 10 is adapted to be concentrically located with respect to the surface heater 25 and has a pellet portion 12 which engages the bottom surface of a cooking utensil resting on the spider portion 22 so that as the temperature of the cooking utensil approaches a preselected value, the sensing device 10 in association with suitable electro-responsive means (not shown) will indicate the attainment of the preselected temperature by lighting a light or energizing a buzzer or may, by way of further example, control the heat output of the surface heater 25 by actuating a solenoid inlet valve to the gas burner 30 or opening or closing a relay to energize or deenergize an electrical heating element.

The pellet portion 12 of the sensing device 10 is preferably connected to a protective cap portion 14 which is movable with respect to a base portion 16 carried by a pair of rigid conduits 18, 20 projecting radially outwardly therefrom. Details of such sensing devices are more particularly set forth in application Serial No. 146,176, filed October 19, 1961, by Rudolph Bergsma.

Each of the conduits 18, 20 includes a rigid outer layer 21 of stainless steel or the like, enclosing a layer 23 of insulating material such as woven fiberglass or asbestos which in turn encloses a current-carrying conductor 26 for conducting current to the temperature-responsive portion of the sensing device. The radially outer ends of the conduits 18, 20 extend through an aperture 59 in the drip pan. They are interconnected by a bracing strap 19 which maintains contact terminals 28 on the conductors 26 in predeterminedly spaced relation. Terminals 28 are slidably received in U-shaped resilient contact clips 54 carried in a conventional terminal block 24 which is secured to the underside of the surface 5 of the range or the like by suitable connecting means such as a bolt 38 and a nut 39.

It should be noted that the gas burner flame is radially outwardly of the sensing device 10 to prevent impingement of the gas flame thereon. Thus, the pellet portion 12 of the senser is primarily sensitive to the temperature of the bottom surface of the cooking utensil and comparatively insensitive to the gas burner flame. The improved mounting relationship nevertheless permits a good heat transfer relationship between the gas burner 30 and a utensil supported by the spider 22. The conduits 18, 20 are subject to the direct heat of the gas burner flame, but as indicated above, are of a suitable construction which is capable of withstanding high temperatures.

The improved mounting relationship between the sensing device 10 and its associated surface heater 25 comprises a hanger element 62 shown in FIG. 4, having arms 60 projecting outwardly on either side of and below a looped upper portion 64. The rigid conduits 18, 20 are connected to the arms 60 by suitable fastening means such as welding as indicated at points 61. The looped upper portion 64 of the hanger element slides over the radially inner end of one of the spider arms 36 to secure the sensing device 10 radially inwardly of the terminal block 24 and to locate the pellet portion 12 of the sensing device 10 in a coplanar relationship with respect to the bottom surface of a cooking utensil on the spider portion 22. The reaction between the contact clips 54 in the terminal block 24 and the terminals 28 at the radially outer ends of the conduits 18, 20 counteracts any forces acting on the sensor 10 which might cause it to swing downwardly about a pivot point defined by the hanger element 62.

The sensing device 10 can be quickly removed from the surface heater 25 by moving it to the left in FIG. 1, *thereby withdrawing terminals* 28 *from the associated clips* 54 and simultaneously sliding the looped upper portion 64 of the hanger element radially inwardly along the arm 36 of the spider portion until the cap portion 14 of the sensor 10 engages an oppositely disposed spider arm. Then the sensing device 10 is swung upwardly and leftwardly through the central aperture defined by the radially innermost ends of the spider arms 36, completing the separation of the hanger 62 from the spider arm and unplugging terminals 28 from terminal block 24. Alternatively, the sensing device 10 can be removed from the heater assembly 25 along with the spider portion 22 and drip pan 8 by merely unplugging the terminals 28 from the terminal block 24. The burner unit 30 will then be accessible for cleaning or repair.

The sensing device 10 can be quickly mounted in the surface heater assembly 25 by inserting the conductor-carrying conduits 18, 20 through the central aperture defined by the radially innermost ends of the spider arms 36 and the aperture 59 in the drip pan. The hanger loop 64 is then positioned adjacent the radially innermost end of one of the spider arms 36 and slipped thereon as the terminals 28 on the conduits 18, 20 are plugged into the terminal block 24.

As most clearly appears in FIG. 3, the terminal block 24 is of a conventional form which includes opposed channel-shaped wall housing portions 40, 42 of suitable electrical insulating material such as Bakelite. Each housing portion 40, 42 has a central rib 44, 46, respectively, interconnected by fastening means such as a rivet 48. The central ribs 44, 46 and outer walls of the housing portions 40, 42 define apertures 50, 52 each of which carries an aforesaid U-shaped current-carrying conductor 54 having spaced free end portions 54a, 54b spring-biased toward one another. The inner end portion 54b of each conductor 54 is biased into electrical contact with a shorting strip 56 when the conductor terminals 28 of the sensing device 10 are out of engagement with the terminal block 24. The bight portions of the U-shaped conductors 54 connect to terminal portions 58 projecting outwardly on either side of the terminal block 24 which are adapted to electrically connect the sensing device 10 to a suitable control system (not shown) which may, for example, energize or deenergize the surface heater 25 depending on the temperature sensed by the sensing device 10. In many control systems, the impedance of the sensing device is included in the circuit to reduce the effective voltage of the system in a preselected manner. When the sensing device 10 is removed from the circuit, the effective voltage therein will consequently increase. The increased effective voltage in some cases may damage portions of the circuit. Therefore, when the voltage reducing impedance of the sensing device 10 is no longer present in the circuit the shorting strip 56 will contact the end portions 54b to short out portions of the control circuit which are unable to withstand the increased effective voltage to prevent their being damaged.

When the terminals 28 of the sensing device 10 are inserted into the terminal block 24 they spread the free ends 54a, 54b of each conductor 54 and thereby move the inner ends 54b of the conductor 54 out of engagement with the shorting strip 56 to remove it from the control circuit. With the impedance of the sensing device 10 included in the circuit the effective voltage will be reduced therein so that the control circuit can safely operate in carrying out its normal control function.

It will be understood that the specific construction of the improved temperature sensor assembly which is herein disclosed and described is presented for purposes of explanation and illustration and is not intended to indicate limits of the invention, the scope of which is defined by the following claims.

What is claimed is:

1. In a temperature senser assembly for sensing the temperature of a utensil supported by utensil supporting means with respect to and in heat transfer relationship with a surface heater, the combination of senser means having outwardly projecting conduit means having end portions adapted to connect to means affected by said senser means, and hanger means on said conduit means between said senser means and said end portions adapted to releasably engage said utensil supporting means for removably supporting said senser means with respect to said surface heater.

2. In a temperature senser assembly for sensing the temperature of a utensil supported by utensil supporting means with respect to and in heat transfer relationship with a surface heater, the combination of senser means having outwardly projecting conduit means, terminal means on said conduit means adapted to electrically connect to means affected by said senser means, and hanger means for said conduit means comprising an upper looped portion adapted to slidingly engage said utensil support means for removably supporting said senser means with respect to said surface heater.

3. In a temperature senser assembly for sensing the temperature of a utensil supported by utensil supporting means with respect to and in heat transfer relationship with a surface heater, the combination of senser means having outwardly projecting conduit means, terminal means on said conduit means adapted to electrically connect with a releasable plug-in action to means affected by said senser means, and hanger means for said conduit means comprising an upper looped portion adapted to slidingly engage said utensil support means for removably supporting said senser means with respect to said surface heater.

4. In a temperature senser assembly for sensing the temperature of a utensil supported with respect to and in heat transfer relationship with a surface heater by utensil supporting means having a central aperture therein, the combination of senser means having outwardly projecting conduits adapted to insert through said central aperture for locating said senser means concentrically with respect to said central aperture and in intimate heat transfer contact with said cooking utensil, terminals on said conduits adapted to removably connect to means for electrically connecting said senser means to means affected by said senser, and hanger means comprising a looped upper portion adapted to slidingly engage said utensil supporting means and outwardly projecting arms carrying said conduits for removably supporting said senser means with respect to said surface.

5. A temperature senser assembly for sensing the temperature of a utensil in heat transfer relationship with a surface heater, comprising a spider for supporting said utensil having a plurality of circumferentially spaced arms defining a central opening, senser means having outwardly projecting conduit means adapted to be inserted through said central opening for locating said senser means concentrically in said central opening for intimate heat transfer contact with the bottom surface of said cooking utensil, terminal means on said conduit means adapted to removably connect to means for connecting said senser means to means affected by said senser means, and hanger means connecting said conduit to one of said spider arms for removably supporting said senser means with respect to said surface heater.

6. A temperature senser assembly for sensing the temperature of a utensil in heat transfer relationship with a surface heater, comprising a spider for supporting said utensil having a plurality of circumferentially spaced arms defining a central opening, senser means having outwardly projecting conduits adapted to be inserted through said central opening and located said senser means concentrically in said central opening for intimate heat transfer relationship with the underside of said utensil, terminals on said conduits adapted to removably connect to means for electrically connecting said senser means to temperature control means, and hanger means connected to said conduits between said senser means and said terminals adapted to slidingly engage one of said spider arms for removably supporting said senser means with respect to said surface heater.

7. A temperature senser assembly for sensing the temperature of a utensil in heat transfer relationship with a surface heater, a spider for supporting said utensil having a plurality of circumferentially spaced arms defining a central opening, senser means having outwardly projecting conduit means adapted to be inserted through said central opening and locate said senser means concentrically with respect to said central opening for intimate heat transfer contact with the underside of said utensil, terminal means on said conduit means adapted to electrically connect with a releasable plug-in action to terminal means associated with means affected by said senser means to temperature control means, and hanger means comprising a looped upper portion adapted to slidingly engage one of said spider arms and an outwardly projecting arm carrying said conduit for positively but removably supporting said senser means relative to said surface heater.

No references cited.

UNITED STATES PATENT OFFICE
CERTIFICATE OF CORRECTION

Patent No. 3,100,995                                            August 20, 1963

Gray F. Woodward

It is hereby certified that error appears in the above numbered patent requiring correction and that the said Letters Patent should read as corrected below.

Column 4, line 71, after "surface" insert -- heater --; column 5, line 18, for "located" read -- locate --.

Signed and sealed this 31st day of March 1964.

(SEAL)
Attest:
ERNEST W. SWIDER

Attesting Officer

EDWARD J. BRENNER

Commissioner of Patents